(12) United States Patent
Mazur et al.

(10) Patent No.: US 9,290,147 B2
(45) Date of Patent: Mar. 22, 2016

(54) AIRBAG CONTROL ASSEMBLY

(71) Applicant: Johnson Controls Technology Company, Holland, MI (US)

(72) Inventors: William A. Mazur, Dearborn, MI (US); Liviu Rus, Bloomfield Hills, MI (US)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 14/577,127

(22) Filed: Dec. 19, 2014

(65) Prior Publication Data

US 2015/0175112 A1 Jun. 25, 2015

Related U.S. Application Data

(60) Provisional application No. 61/919,601, filed on Dec. 20, 2013.

(51) Int. Cl.
*B60R 21/015* (2006.01)

(52) U.S. Cl.
CPC .............................. *B60R 21/01554* (2014.10)

(58) Field of Classification Search
CPC ................................................ B60R 21/01554
See application file for complete search history.

(56) References Cited

U.S. PATENT DOCUMENTS

| | | | | |
|---|---|---|---|---|
| 4,804,859 A | * | 2/1989 | Swart | 307/10.1 |
| 5,831,342 A | * | 11/1998 | Vivacqua et al. | 307/10.1 |
| 5,893,582 A | * | 4/1999 | Allen et al. | 280/735 |
| 5,967,549 A | * | 10/1999 | Allen et al. | 280/735 |
| 6,236,920 B1 | * | 5/2001 | Hora | 701/45 |
| 6,255,790 B1 | * | 7/2001 | Popp et al. | 318/280 |
| 6,302,439 B1 | * | 10/2001 | McCurdy | 280/735 |
| 6,422,595 B1 | * | 7/2002 | Breed et al. | 280/735 |
| 6,565,119 B2 | * | 5/2003 | Fogle, Jr. | 280/735 |
| 6,682,095 B2 | * | 1/2004 | Roychoudhury et al. | 280/735 |
| 6,907,795 B2 | * | 6/2005 | Barnabo et al. | 73/862.69 |
| 7,159,899 B2 | * | 1/2007 | Nitschke et al. | 280/735 |
| 7,168,738 B2 | * | 1/2007 | Garcia et al. | 280/735 |
| 7,232,152 B2 | * | 6/2007 | Isakov et al. | 280/736 |
| 7,987,033 B2 | * | 7/2011 | Launay et al. | 701/49 |
| 2001/0009327 A1 | * | 7/2001 | Zeigler | 280/735 |
| 2008/0021650 A1 | * | 1/2008 | Launay et al. | 702/1 |
| 2009/0027188 A1 | * | 1/2009 | Saban | 340/521 |

\* cited by examiner

*Primary Examiner* — Nicole Verley
(74) *Attorney, Agent, or Firm* — Foley & Lardner LLP

(57) ABSTRACT

An airbag control assembly for an adjustable vehicle seat in a vehicle may include electrical wiring and an airbag mechanism. The electrical wiring may be configured to transmit electricity from a vehicle power supply of the vehicle to an airbag. The airbag mechanism may be configured to cause enabling and disabling of the airbag. The airbag mechanism may be configured to cause enabling of the airbag if the seat is in a usable position and may be configured to cause disabling of the airbag if the seat is in an unusable position.

12 Claims, 17 Drawing Sheets

LOGIC TABLE
FREE STANDING VEHICLE SEAT 22 WITH SEAT BACK 24 RECLINE

| VARIABLE SEAT BACK 24 POSITION | SEATING POSITION | SEAT BACK 24 IS LOCKED | AIRBAG 28 STATUS |
|---|---|---|---|
| UPRIGHT POSITION 44 | YES | YES | ENABLED |
| BETWEEN UPRIGHT POSITION 44 AND RECLINED POSITION 42 | YES | YES | ENABLED |
| RECLINED POSITION 42 | YES | YES | ENABLED |
| BETWEEN UPRIGHT POSITION 44 AND UNUSABLE POSITION 46 | NO | NO | DISABLED |
| UNUSABLE POSITION 46 | NO | YES OR NO | DISABLED |

FIG. 4B

LOGIC TABLE
FREE STANDING VEHICLE SEAT 22 WITH SEAT BACK 24 RECLINE

| VARIABLE SEAT BACK 24 POSITION | SEATING POSITION | SEAT BACK 24 IS LOCKED | AIRBAG 28 STATUS |
|---|---|---|---|
| UPRIGHT POSITION 44 | YES | YES | ENABLED |
| BETWEEN UPRIGHT POSITION 44 AND UNUSABLE POSITION 46 | NO | NO | DISABLED |
| UNUSABLE POSITION 46 | NO | YES OR NO | DISABLED |

FIG. 5B

LOGIC TABLE
VEHICLE SEATS 22 WITH AIRBAGS 58, 68 WITHIN FIXED BOLSTER REGIONS 56, 66

| CONFIGURATION (FIGURE) | RIGHT-HAND SEAT BACK 54 | | CENTER SEAT BACK 74 | | LEFT-HAND SEAT BACK 64 | | AIRBAG STATUS: | |
|---|---|---|---|---|---|---|---|---|
| | SEATING POSITION | LATCH LOCKED | SEATING POSITION | LATCH LOCKED | SEATING POSITION | LATCH LOCKED | RIGHT-HAND AIRBAG 58 | LEFT-HAND AIRBAG 68 |
| 7A | YES | YES | YES | YES | YES | YES | ENABLED | ENABLED |
| 7B | NO | NO | YES | YES | YES | YES | DISABLED | ENABLED |
| 7C | NO | NO | NO | NO | YES | YES | DISABLED | ENABLED |
| 7D | YES | YES | NO | NO | NO | NO | ENABLED | DISABLED |
| 7E | YES | YES | NO | NO | YES | YES | ENABLED | DISABLED |
| 7F | YES | YES | YES | YES | YES | YES | ENABLED | ENABLED |
| 7G | NO | NO | YES | YES | NO | NO | DISABLED | DISABLED |

FIG. 7H

AIRBAG CONTROL ASSEMBLY

CROSS-REFERENCE TO RELATED PATENT APPLICATIONS

This application claims priority to and the benefit of U.S. Provisional Patent Application No. 61/919,601, filed Dec. 20, 2013, the entire disclosure of which is incorporated herein by reference.

FIELD

The disclosure relates generally to an airbag control assembly for an adjustable vehicle seat in a vehicle.

BACKGROUND

Generally, airbags are deployed within a vehicle in the event of an accident to protect the occupants. Airbags may be located throughout the inside of a vehicle to protect all sides of the occupant, including in the instrument panel, inside the vehicle seat, and along the side of the vehicle. The airbags may deploy, even if the seat is in an unusable position (e.g. partially or completely folded). However, if the airbags deploy while the seat is in an unusable position, the safety of occupants in other seats may be compromised. For example, if the seat is folded in an unusable position and is not locked into position, the seat back may be launched backward or flipped up if an airbag within the seat is deployed, thereby potentially harming or injuring the surrounding or nearby occupants. Further, any objects resting on the folded seat back will be launched as a projectile if the airbag deploys in the folded, unlocked position.

Additionally, even if the seat is locked while in an unusable position, a deployed airbag within the seat may result in costly repairs within the vehicle, without providing additional safety features to the occupants.

SUMMARY

According to one embodiment, an airbag control assembly for an adjustable vehicle seat in a vehicle may include electrical wiring and an airbag mechanism. The electrical wiring may be configured to transmit electricity from a vehicle power supply of the vehicle to an airbag. The airbag mechanism may be configured to cause enabling and disabling of the airbag. The airbag mechanism may be configured to cause enabling of the airbag if the seat is in a usable position and may be configured to cause disabling of the airbag if the seat is in an unusable position.

According to another embodiment, a method of controlling an airbag for a vehicle seat in a vehicle may include detecting whether the seat is locked and a current position of the seat, enabling the airbag if the seat is in a usable position, and disabling the airbag if the seat is in an unusable position.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Features, aspects, and advantages of the present invention will become apparent from the following description, appended claims, and the accompanying exemplary embodiments shown in the drawings, which are briefly described below.

FIG. 7H is a logic table for the positions of the vehicle seats of FIGS. 7A-7G.

DETAILED DESCRIPTION

Referring generally to the figures, disclosed herein is an airbag control assembly for use with an adjustable vehicle seat in a vehicle, as shown according to exemplary embodiments, that correlates airbag activation to the position of the vehicle seat. The airbag control assembly and methods described herein may be used in a variety of applications and adjustable devices, wherein it would be desirable to enable or disable an airbag based on a position of a seat. In one exemplary embodiment, the airbag control assembly may be used within a vehicle to enable or disable at least one airbag according to the current position of the seat. For example, the airbag control assembly may enable the airbag if the vehicle seat is in a usable position or may disable the airbag if the vehicle seat is in an unusable position.

Figure 1:
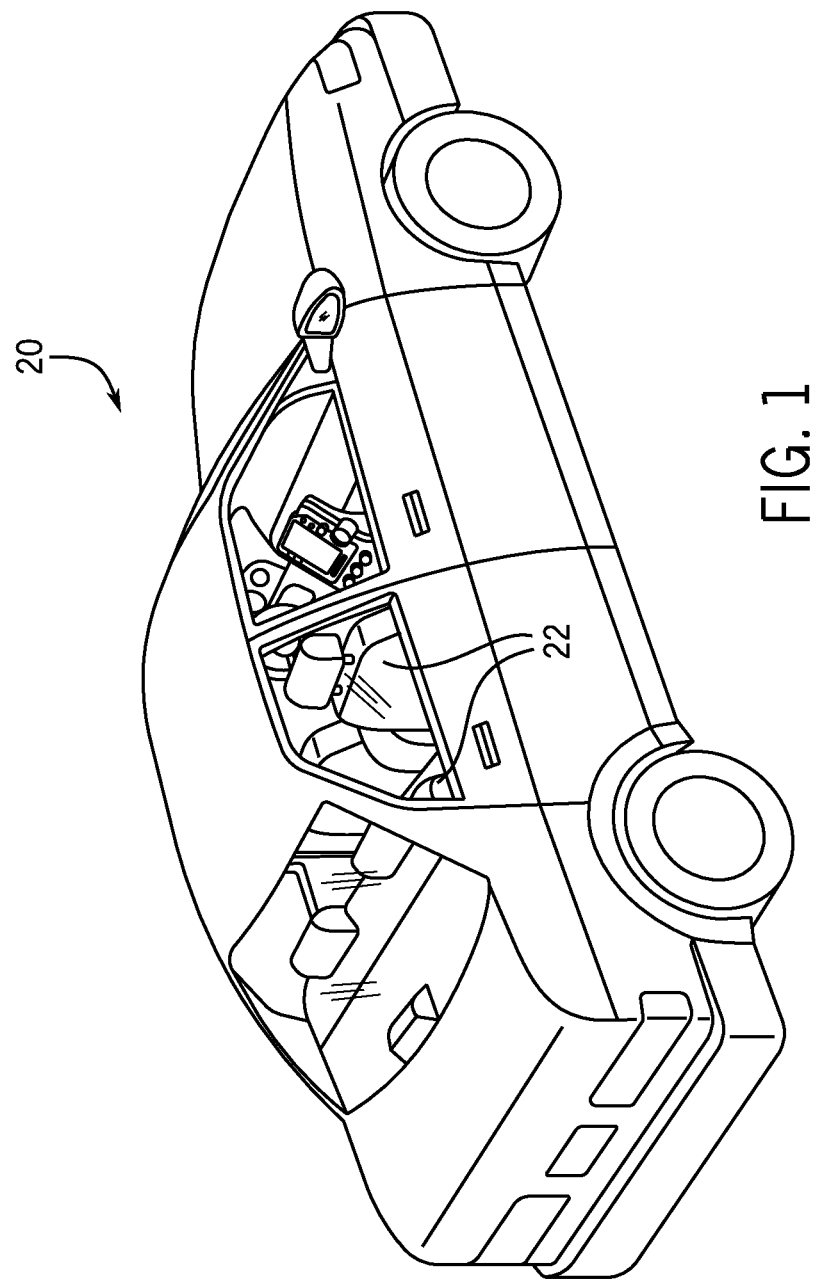
FIG. 1 is a perspective view of a vehicle according to one embodiment.

FIG. 1 illustrates an exemplary embodiment of a vehicle 20 that may include a movable or adjustable vehicle seat 22 with an airbag control assembly 80 (as described further herein). The vehicle 20 may include an interior passenger compartment containing the vehicle seat 22 for providing seating to an occupant. Although a four door sedan automobile is shown in FIG. 1, the airbag control assembly may be used in a variety of applications, but is particularly useful with a vehicle seat 22 in any type of vehicle, such as a two door or four door automobile, a truck, a SUV, a van, a train, a boat, an airplane, or other suitable vehicular conveyance. Even more preferably, multiple airbag control assemblies could be disposed at various locations within the vehicle 20, such that each airbag is controlled by a particular airbag control assembly according to the position of at least one particular seat.

Figure 2:
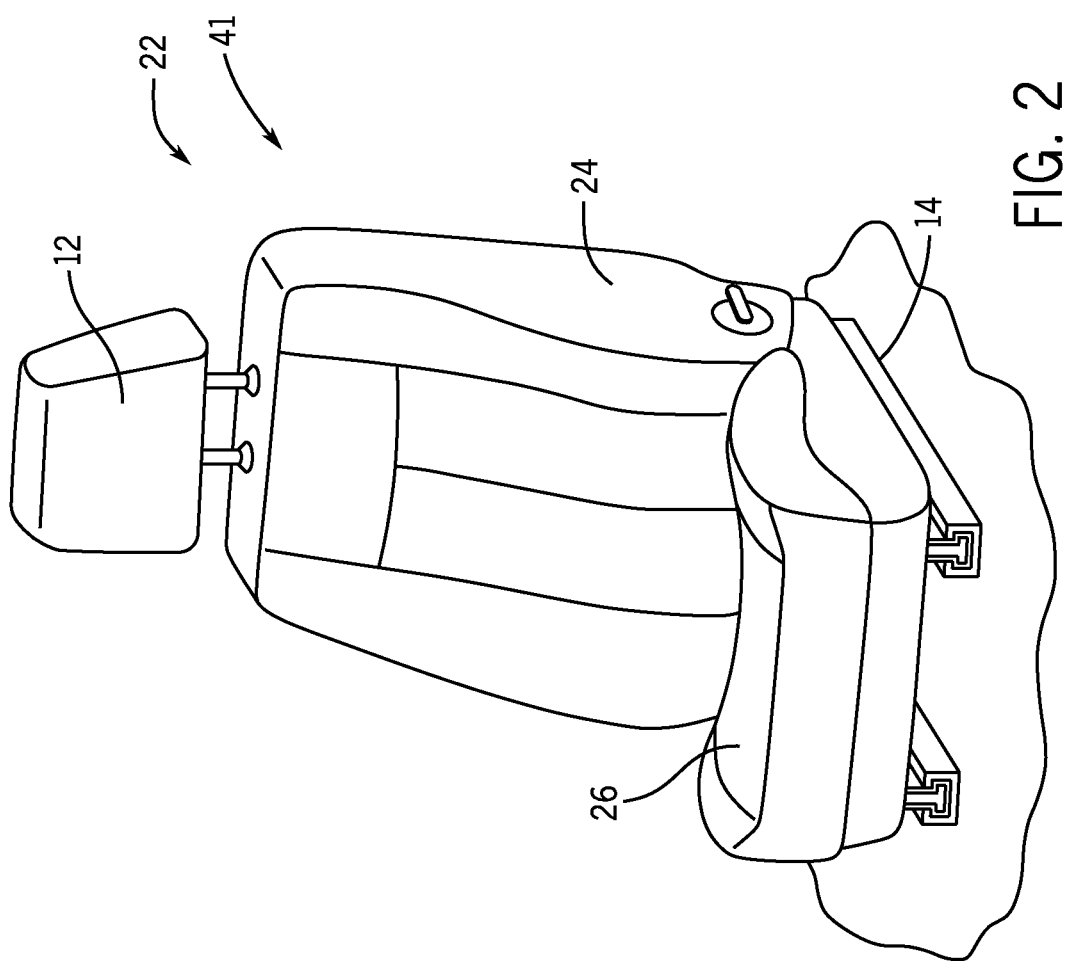
FIG. 2 is a perspective view of an embodiment of a vehicle seat that can be disposed in the vehicle of FIG. 1.
Figure 6:
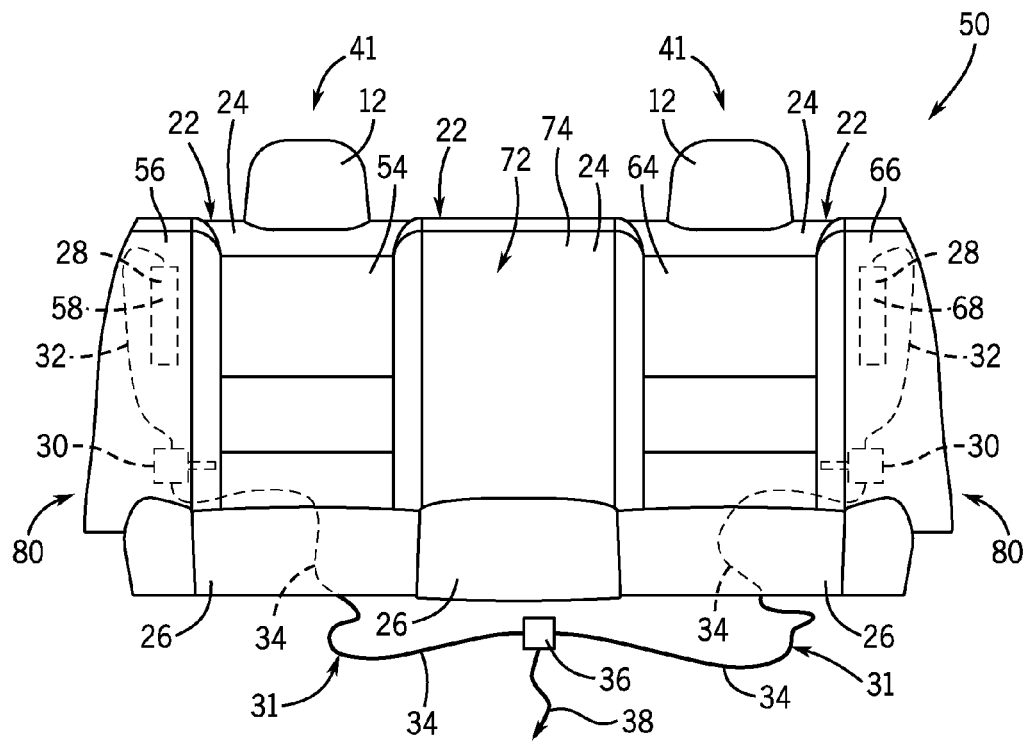
FIG. 6 is a front, partially see-through view of an embodiment of a row of vehicle seats that can be disposed in the vehicle of FIG. 1.

According to one embodiment as depicted in FIG. 2, the vehicle seat 22 can be disposed in the interior passenger compartment to provide front, middle, or rear seating for an occupant within a vehicle 20. The vehicle seat 22 may be a stand-alone seat (as shown in FIG. 2) or part of a row of vehicle seats (as shown in FIGS. 6-7F). The vehicle seat 22 may be any free-standing (e.g. attached to the floor of the vehicle 20) or attached (e.g. attached to the body of the vehicle 20) seat.

Figure 3:
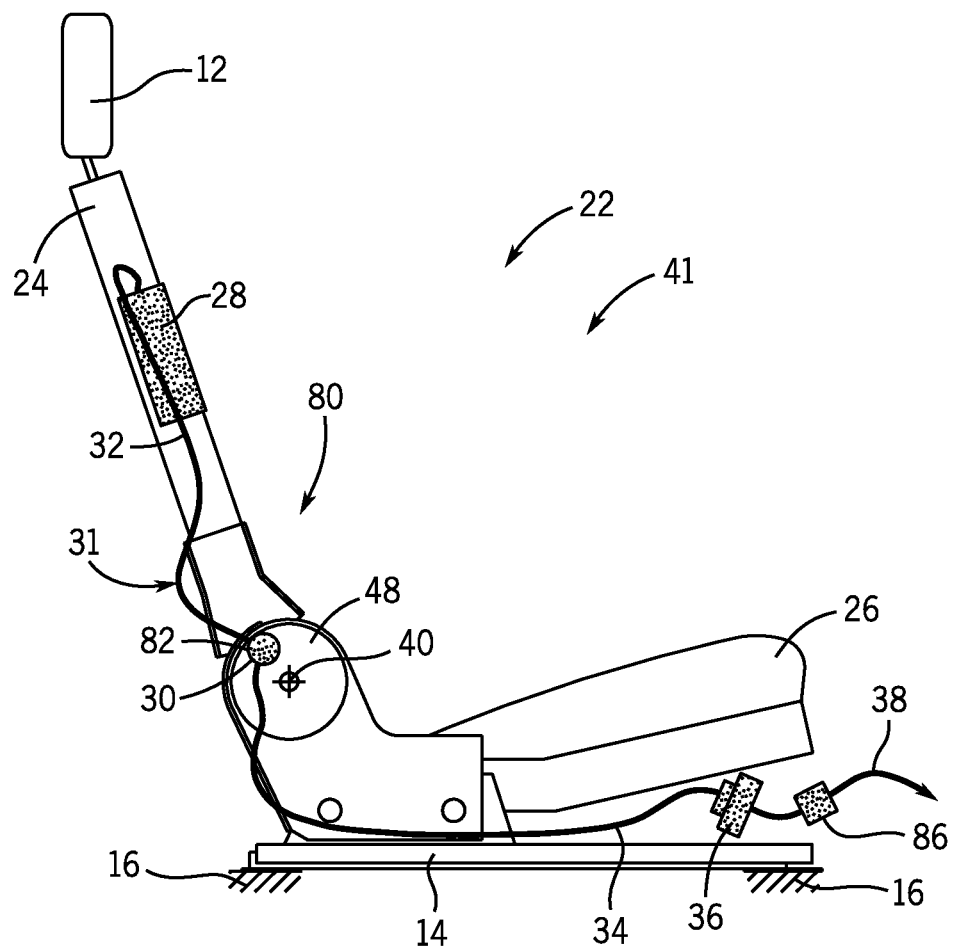
FIG. 3 is a side view of the vehicle seat of FIG. 2 with one embodiment of the airbag control assembly.

The vehicle seat 22 may include a seat back 24, a cushion 26 and a head restraint 12. The seat back 24 and the cushion 26 may each include at least a portion of the seat frame, as shown in the figures. The seat back 24 and the cushion 26 may be adjustable relative to each other and the floor of the vehicle 20, as shown in FIGS. 4A, 5A, and 7A-7F. For example, the seat back 24 may pivot around a seat back axis or pivot 40. A recliner or seat back lock assembly 48 may allow the seat back 24 to be either locked/latched or unlocked/unlatched in a particular position. The vehicle seat 22 may optionally be adjustable or movable relative to the vehicle 20 along a seat track 14, which may be mounted to the floor of the vehicle 20 through seat mountings 16 (as shown in FIG. 3).

As described further herein, the vehicle seat 22 may be adjustable or movable between a usable position 41 and an unusable position 46. The position of the seat (e.g., a seating position or a folded position) and whether the seat 22 is locked may determine whether the seat 22 is in a usable position 41 or an unusable position 46. Accordingly, the vehicle seat 22 may be a folding, foldable, or stowable seat. To move or adjust between the usable position 41 (e.g., the seating position) and the unusable position 46 (e.g., the folded position), the vehicle seat 22 may use a variety of different mechanisms, including but not limited to a recliner mechanism, latch, and/or folding mechanism. Additionally, the vehicle seat 22 may "lock" various components (e.g., the seat back 24) into the desired position with, for example, lock assembly 48. Such mechanisms and components will be understood by a person skilled in the art upon reading this disclosure.

Figure 4:
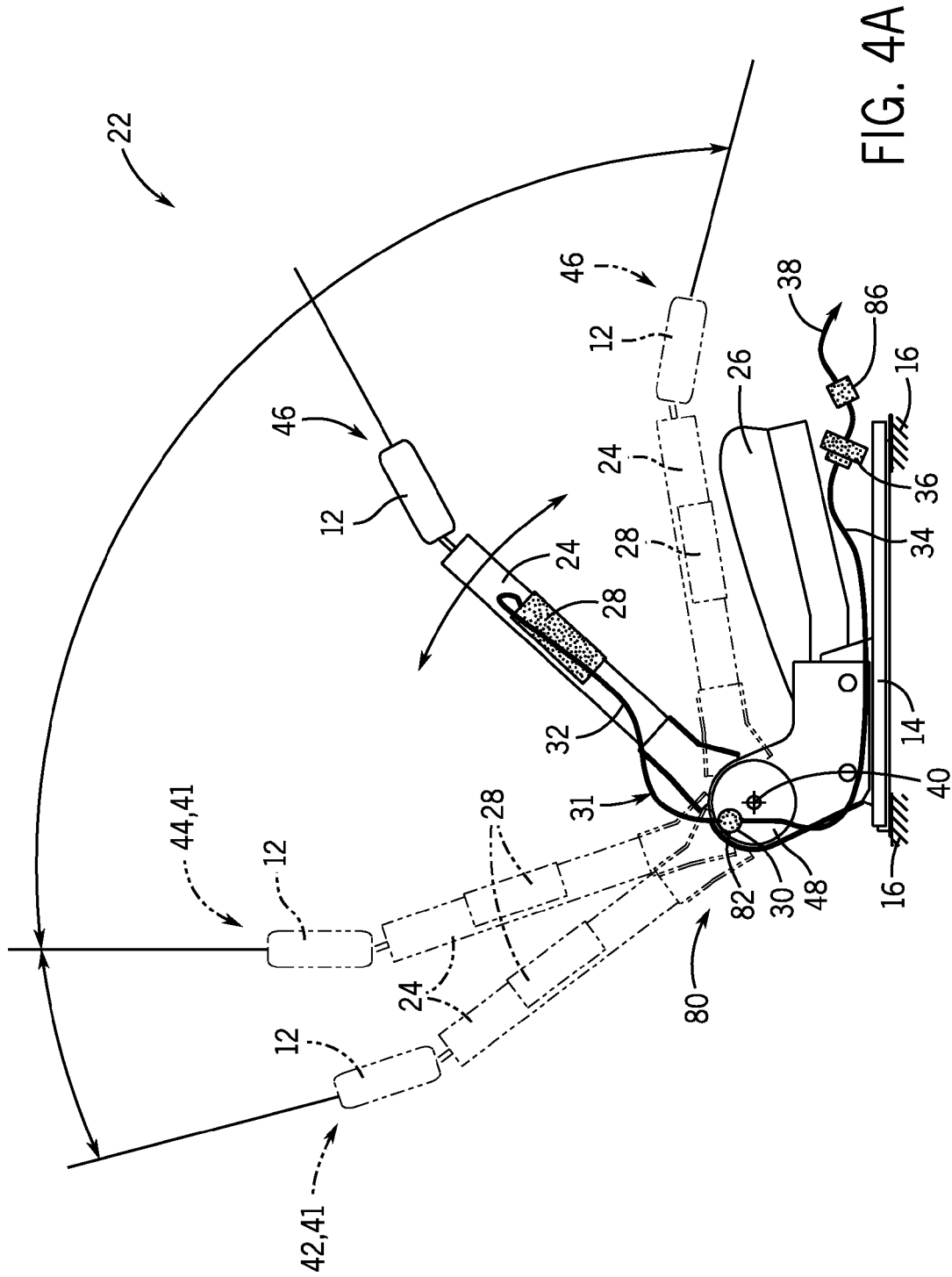
FIG. 4A is a side view of the vehicle seat of FIG. 3 in multiple positions.
FIG. 4B is a logic table for the positions of the vehicle seat of FIG. 4A.
Figure 5:
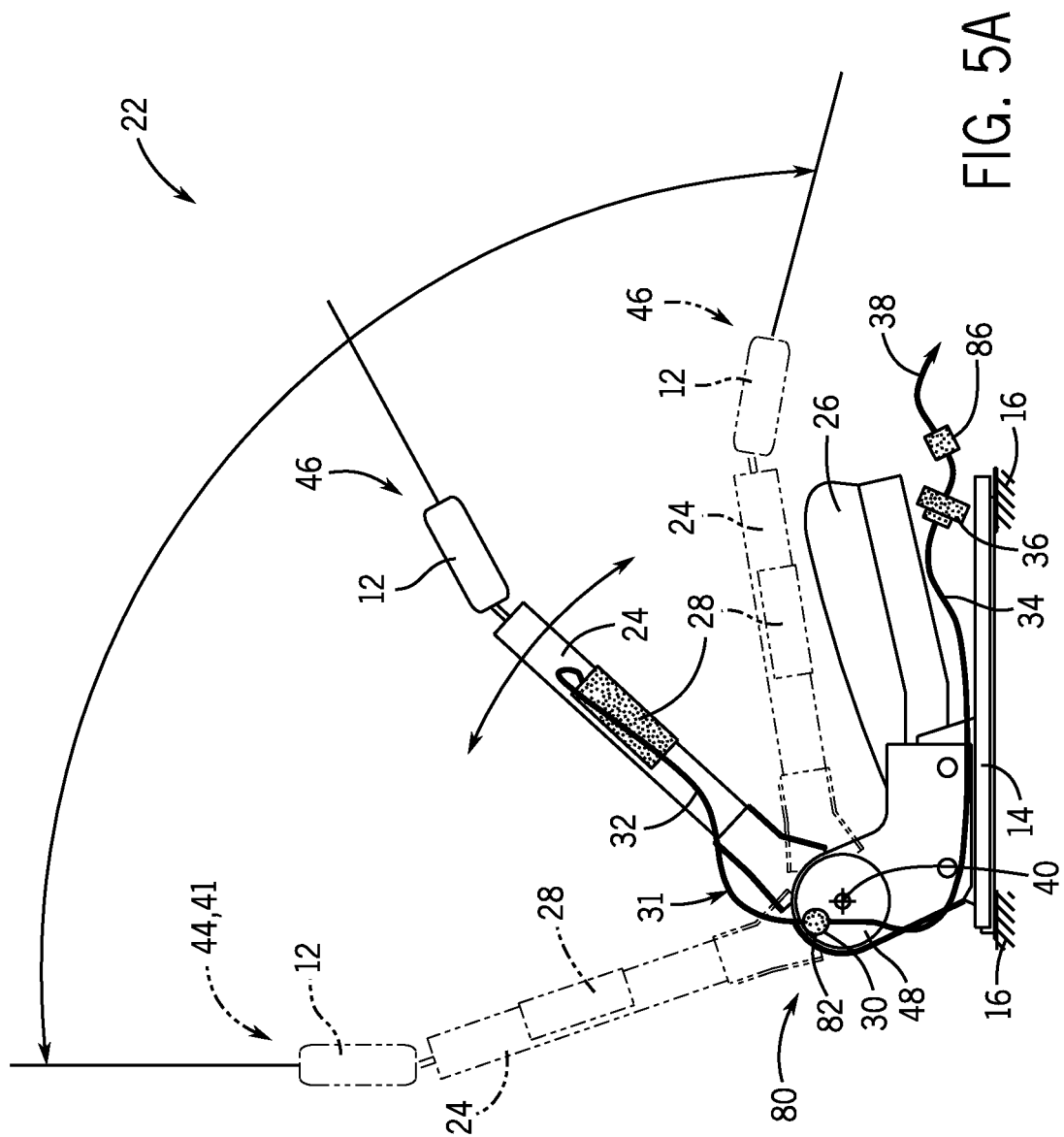
FIG. 5A is a side view of the vehicle seat of FIG. 2 in multiple positions.
FIG. 5B is a logic table for the positions of the vehicle seat of FIG. 5A.

FIGS. 4A, 5A, and 7A-7F depict exemplary positions of the vehicle seat 22 as the seat back 24 is adjusted relative to the cushion 26 around the seat back pivot point 40 (although other positions of the vehicle seat 22 are anticipated). FIG. 4A depicts various positions of a vehicle seat 22 with a reclining mechanism, FIG. 5A depicts various positions of a vehicle seat 22 without a reclining mechanism, and FIGS. 7A-7F depict various positions and configurations of moveable, adjustable, or foldable vehicle seats 22 within a vehicle seat row 50 in a vehicle 20.

The usable position 41 may correspond to when the seat 22 is in a seating position and the seat is locked in that position. The seat 22 is in the seating position when the seat 22 allows an occupant to properly or safely sit on or within or occupy the seat 22 or when the vehicle seat 22 provides a proper seating surface. Accordingly, while the seat 22 is locked in the seating position (e.g., an upright position 44, an at least partially reclined position, or a reclined position 42), the seat 22 may be in the usable position 41.

For example, as shown in FIG. 4A, the vehicle seat 22 may be in a seating position that is a reclined position 42, in which the seat back 24 is leaned or reclined backward and the angle between the seat back 24 and the cushion 26 is relatively large. The vehicle seat 22 may be in a seating position that is an upright position 44 (e.g. a "normal" seating position), in which the angle between the seat back 24 and the cushion 26 is less than in a reclined position, but more than the unusable position 46. Both the reclined position 42 and the upright position 44 (and any position in the range between the fully reclined position 42 and a completely upright position 44) may be considered seating position and, thus, potentially usable positions 41.

While the vehicle seat 22 is in the usable position 41, certain components (e.g., the vehicle seat 22, seat back 24, latch and/or seat cushion 26) may be locked or latched. Accordingly, the seat 22 may be locked to the floor of the vehicle 20 and the seat back 24 and the seat cushion 26 may be locked relative to each other in the usable position 41.

The unusable position 46 may correspond to a folded position that does not allow an occupant to sit on or within or occupy the seat 22 or provide a seating surface. Accordingly, while at least a portion of the seat 22 is folded, collapsed, or stowed, the seat 22 may be in the unusable position 46.

For example, as shown in FIGS. 4A, 5A, and 7B-7F, the seat back 24 may be partially or completely collapsed or folded over the cushion 26 in a folded position, and thus, the unusable position 46. The angle between the seat back 24 and the cushion 26 may be less than that of the upright position 44 and the reclined position 42. Alternatively or additionally, the folded position (and thus, the unusable position 46) may include when cushion 26 is at least partially unattached from the vehicle floor, thereby rendering the vehicle seat 22 unusable for an occupant to use the vehicle seat 22 as proper seating.

If a particular portion of the seat 22 is unlocked, the seat 22 may be considered to be in an unusable position 46, regardless as to whether the seat 22 is, for example, in a seating position or folded position. For example, if the vehicle seat 22, seat back 24, latch and/or seat cushion 26 is unlatched or unlocked, the seat 22 is in an unusable position 46. According to one embodiment, the seat 22 is in the unusable position 46 when the seat 22 is unattached from the floor of the vehicle 20 or the seat back 24 and the seat cushion 26 are unlocked relative to each other.

According to one embodiment, the vehicle seat 22 may include at least one airbag 28 installed into or near the vehicle seat 22, as shown for example, in the single vehicle seat 22 of FIG. 3 and the row of vehicle seats 22 in FIG. 6. The airbag 28 may be positioned within and/or near vehicle seat 22 to protect the occupant of the vehicle seat 22. It is anticipated that the airbag control assembly 80 may be used with any type of airbag 28, any location of airbag 28, and any type of vehicle seat 22.

A variety of different types of airbags 28 may be used with the vehicle seat 22 and the airbag control assembly 80. For example, side airbags, supplemental airbags, torso airbags, curtain airbags, front airbags, knee airbags, inflatable seat belts may be used to protect the occupant within the vehicle seat 22 and may be used within the present invention. For example, the airbag 28 shown in FIGS. 3, 4A, 5A, 8, and 9 is a supplemental airbag within the vehicle seat 22 that may fold with the seat back 24. According to another embodiment, the airbag 28 shown in FIGS. 6 and 7A-7F is a side airbag 28 within a fixed bolster region 56 and 66, such that the airbag 28 does not fold with the seat back 24.

The airbag 28 may be located in a variety of different areas within the vehicle 20, relative to the vehicle seat 22. The airbag 28 may be located within the seat 22 or on a body of the vehicle 20 near the seat 22. The airbag 28 may be folded or stowed with the vehicle seat 22 (e.g. within the vehicle seat 22 (e.g., on the side of the frame of the seat back 24), as shown in FIGS. 3, 4A, 5A, 8, and 9), may be located next to vehicle seat 22 (e.g. next to the foldable or stowable portion of the vehicle seat 22, in a discrete or fixed bolster region that does not fold or stow with the vehicle seat 22, as shown in FIGS. 6 and 7A-7F), or may be located separate from and nearby the vehicle seat 22 (e.g. within the vehicle door, panel, side, or dashboard).

In order to correlate enabling or disabling the airbag 28 to the position of the vehicle seat 22, the airbag control assembly 80 may be used with the vehicle seat 22. The airbag control assembly 80 may include an airbag mechanism 30 configured to cause enabling and disabling of the airbag 28 and electrical wiring 31 configured to transmit electricity from a vehicle power supply 92 of the vehicle 20 to the airbag 28 (as described further herein). Accordingly, the airbag mechanism 30 may be configured to cause enabling of the airbag 28 if the vehicle seat 22 is in the usable position 41 and may be configured to cause disabling of the airbag if the vehicle seat 22 is in the unusable position 46.

The airbag control assembly 80 may control whether or not the airbag 28 is enabled or disabled while the seat 22 is in a variety of different positions (e.g. the usable position 41 and the unusable position 46). While the vehicle seat 22 is in a usable position 41, the airbag mechanism 30 may enable the airbag 28, such that the airbag 28 may deploy in the event of an accident or crash. While the vehicle seat 22 is in an unusable position 46, the airbag mechanism 30 may disable the airbag 28, such that the airbag 28 may not deploy in the event of an accident or crash.

The airbag control assembly 80 may control one airbag 28 or multiple airbags 28 and the vehicle seat 22 may include multiple airbag control assemblies 80. Further, multiple airbag control assemblies 80 may be located throughout the vehicle 20 and may control multiple airbags 28.

The airbag control assembly 80 may be located on, within, and/or near the seat 22. For example, as shown in FIG. 3, the airbag control assembly 80 may be located on the seat frame (and therefore within the seat 22). The airbag control assembly 80, or portions of the airbag control assembly 80, may be built in to the vehicle 20 or vehicle seat 22 or may be an add-on component (with, for example, a rivet or screw within the vehicle seat 22).

As shown in FIG. 4A, the electrical wiring 31 may include a variety of different wires to connect various components and transmit power or electricity from the vehicle power supply 92 of the vehicle 20 to the airbag 28 by allowing the airbag 28 to be connected to and powered by the vehicle 20. Additionally, the electrical wiring 31 may be used to relay a signal the airbag 28 to activate or deploy once impact has been detected (e.g. in the event of an accident or crash). According to one embodiment, the electrical wiring 31 may include airbag electrical conduit wiring 32, seat electrical conduit wiring 34, and/or vehicle electrical conduit wiring 38. Electrical connectors 36, such as a plug or junction box, may be located between the airbag electrical wiring 32, seat electrical wiring 34, and/or vehicle electrical wiring 38.

The airbag electrical wiring 32 may connect directly or indirectly to the vehicle electrical wiring 38. For example, the airbag electrical wiring 32 may connect the airbag 28 to the airbag mechanism 30. The airbag mechanism 30, in turn, may connect to a harness or the seat electrical wiring 34. The seat electrical wiring 34 may connect to another harness or the vehicle electrical wiring 38 through an electrical connector 36.

Depending on the location of the airbag 28 within the vehicle 20, the airbag electrical wiring 32 may run or pass through the vehicle seat 22 (e.g. through the recliner, seat back 24, or latch) and connect to the vehicle electrical wiring 38 through the seat electrical wiring 34, as shown in FIGS. 3, 4A, 6, 8, and 9.

The airbag mechanism 30 may be used to enable (e.g., turn on) or disable (e.g., turn off) the airbag 28 according to the current position of the vehicle seat 22. For example, if the vehicle seat 22 is in the usable position 41, such as a reclined position 42 or an upright position 44, the airbag mechanism 30 will enable or allow the airbag 28 to deploy in the event an accident or crash. Conversely, if the vehicle seat 22 is in the unusable position 46, there should be no occupant in the vehicle seat 22, eliminating the need for deploying the airbag 28. Therefore, while the vehicle seat 22 is in the unusable position 46, the airbag mechanism 30 may turn off or disable the airbag 28 from deploying in the event of an accident or crash. Accordingly, in this disabled configuration, the airbag mechanism 30 may prevent deployment of the airbag 28.

According to one embodiment, the airbag control assembly 80 may include one or more airbag mechanisms 30. Each airbag mechanism 30 may be linked to one or to multiple different airbags 28, such that the multiple airbags 28 are enabled or disabled by one airbag mechanism 30.

The airbag mechanism 30 may function and control whether the airbag 28 is enabled or disabled through a variety of different mechanisms. According to one embodiment as shown in FIGS. 3 and 4A, the airbag mechanism 30 may be or may utilize a switch 82 that allows electricity to flow to the airbag 28 when the vehicle seat 22 is in the usable position 41 and prevent electricity from flowing to the airbag 28 when the vehicle seat 22 is in the unusable position 46. Depending on the current position of the vehicle seat 22, the switch 82 may enable or disable the airbag 28 by allowing or preventing electricity to flow to the airbag 28. For example, the switch 82 may complete or close a circuit between the airbag 28 and vehicle 20 to allow electricity to flow, thus enabling the airbag 28. Conversely, the switch 82 may open, discontinue, or interrupt the circuit or power between the airbag 28 and the vehicle 20 to prevent electricity from flowing, thus disabling the airbag 28. When the processor 86 (which may be used for airbag deployment) detects a vehicle accident, the processor 86 may send a signal through the electrical wiring 31 to deploy the airbag 28.

According to one embodiment, the switch 82 may be a mechanical switch that is physically linked to the vehicle seat 22 such that when the vehicle seat 22 is moved or adjusted to the usable position 41, the switch 82 is physically moved or adjusted to a position in which it allows electricity to flow to the airbag 28. Accordingly, the deployment signal from the processor 86 may flow to the airbag 28 to deploy the airbag 28 in the event of an accident. Conversely, the switch 82 can be physically linked to the vehicle seat 22 such that when the vehicle seat 22 is moved or adjusted to the unusable position 46, the switch 82 is physically adjusted or moved to a position in which the switch 82 prevents or interrupt the flow of electricity to the airbag 28. Accordingly, the deployment signal from the processor 86 may not flow to the airbag 28 in the event of an accident. The switch 82 may be, for example, a proximity switch.

Figure 11:
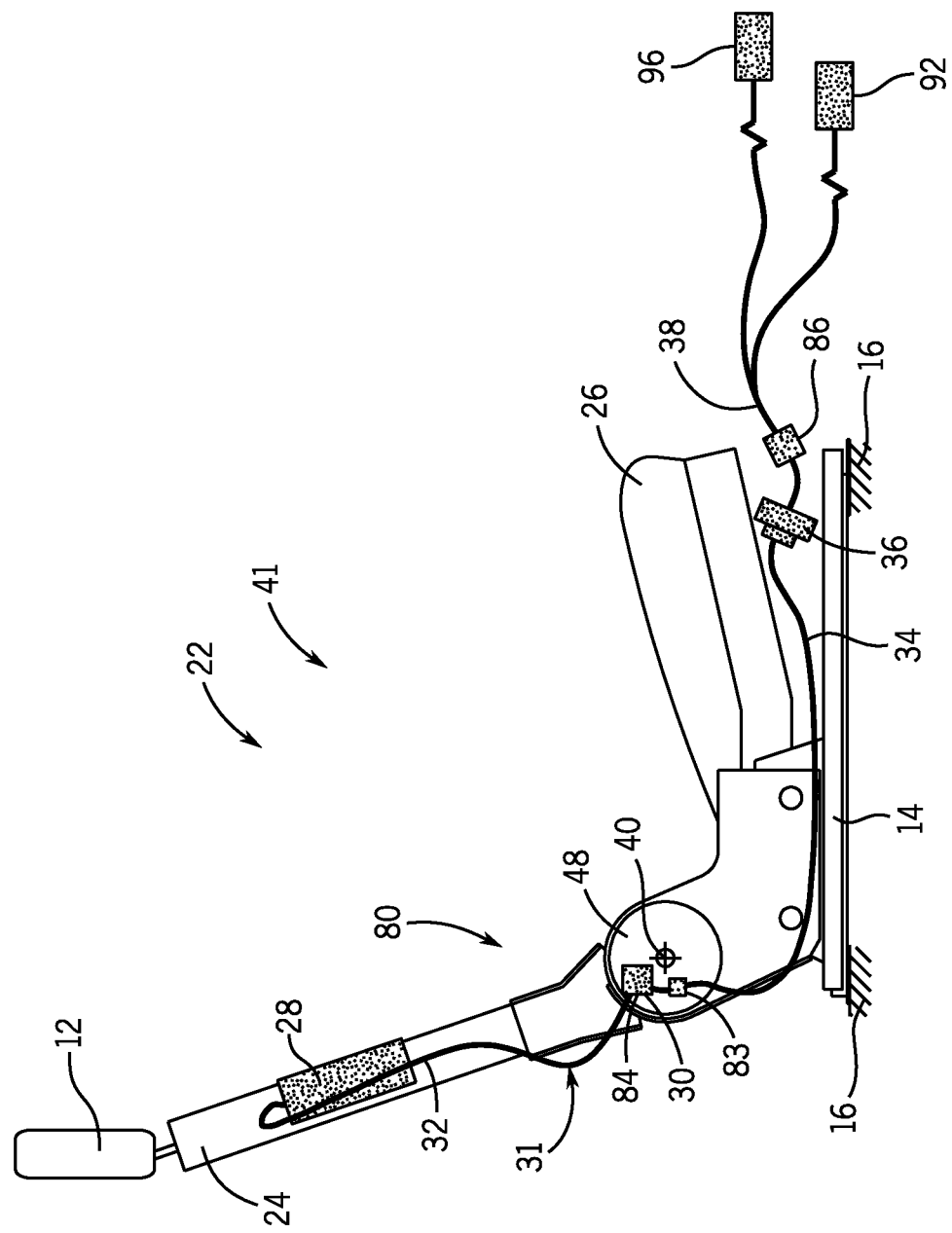
FIG. 11 is a side view of the vehicle seat of FIG. 2 with another embodiment of the airbag control assembly.
Figure 12:
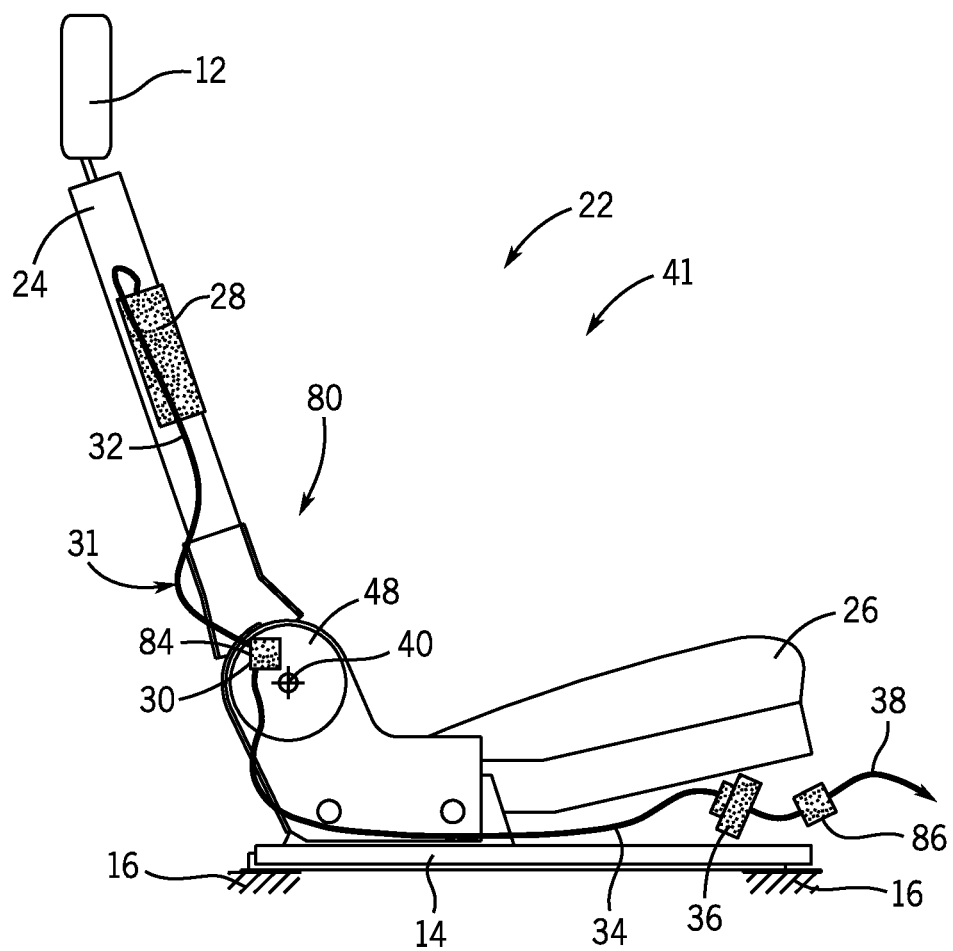
FIG. 12 is a side view of the vehicle seat of FIG. 2 with yet another embodiment of the airbag control assembly.

According to another embodiment as shown in FIGS. 11 and 12, the airbag mechanism 30 may be a position sensor 84 that senses the current position of the vehicle seat 22 and whether or not the vehicle seat 22 is locked into position (e.g., the usable position 41 or the unusable position 46) and may communicate with the processor 86 to cause the processor 86 to enable or disable the airbag 28. The position sensor 84 may send a signal to an airbag processor 86 related to the current position of the vehicle seat 22, which may be used to control the airbag 28. The processor 86 may either permit or prohibit deployment of the airbag 28 depending on the information obtained from the signal from the position sensor 84. The sensor 84 may be located with, within, or apart from the seat 22. Of course, multiple sensors 84 also be used to provide information about the position of the vehicle seat 22. Other functions of the airbag mechanism 30 may be envisioned.

The processor 86 may use logic to determine the position of the seat 22 based on information from the position sensor 84 and/or may be used to deploy the airbag 28 in the event of an accident if the airbag 28 is enabled by the airbag control assembly 80. The processor 86 may be a part of the position sensor 84, a part of the vehicle processor 96, or a separate component. Accordingly, either the processor 86 or the vehicle processor 96 may transmit a signal through the electrical wiring 31 to the airbag mechanism 30 when a vehicle accident has been detected. As described herein, if the seat 22 is in the usable position 41, the airbag 28 will be deployed. If the seat 22 is in the unusable position 46, the airbag 28 will not be deployed or activated.

According to one embodiment shown in FIG. 11, the position sensor 84 may be coupled with an electrical switch 83. The position sensor 84 and/or the processor 86 may send a signal to the electrical switch 83 to turn on or off the electrical switch 83 (e.g., to open or close the circuit and enable or disable the airbag 28). Accordingly, the position sensor 84 may cause the electrical switch 83 to enable or disable the airbag depending on the position of the seat 22.

According to another embodiment shown in FIG. 12, the position sensor 84 may sense the current position of the vehicle seat 22 and may relay the information regarding the position back to the processor 86. Depending on the position of the vehicle seat 22, the processor 86 will send an airbag deployment signal in the event of an accident if the seat 22 is in the usable position 41 and will not send the airbag deployment signal in the event of an accident if the seat 22 is in the unusable position 46.

Figure 8:
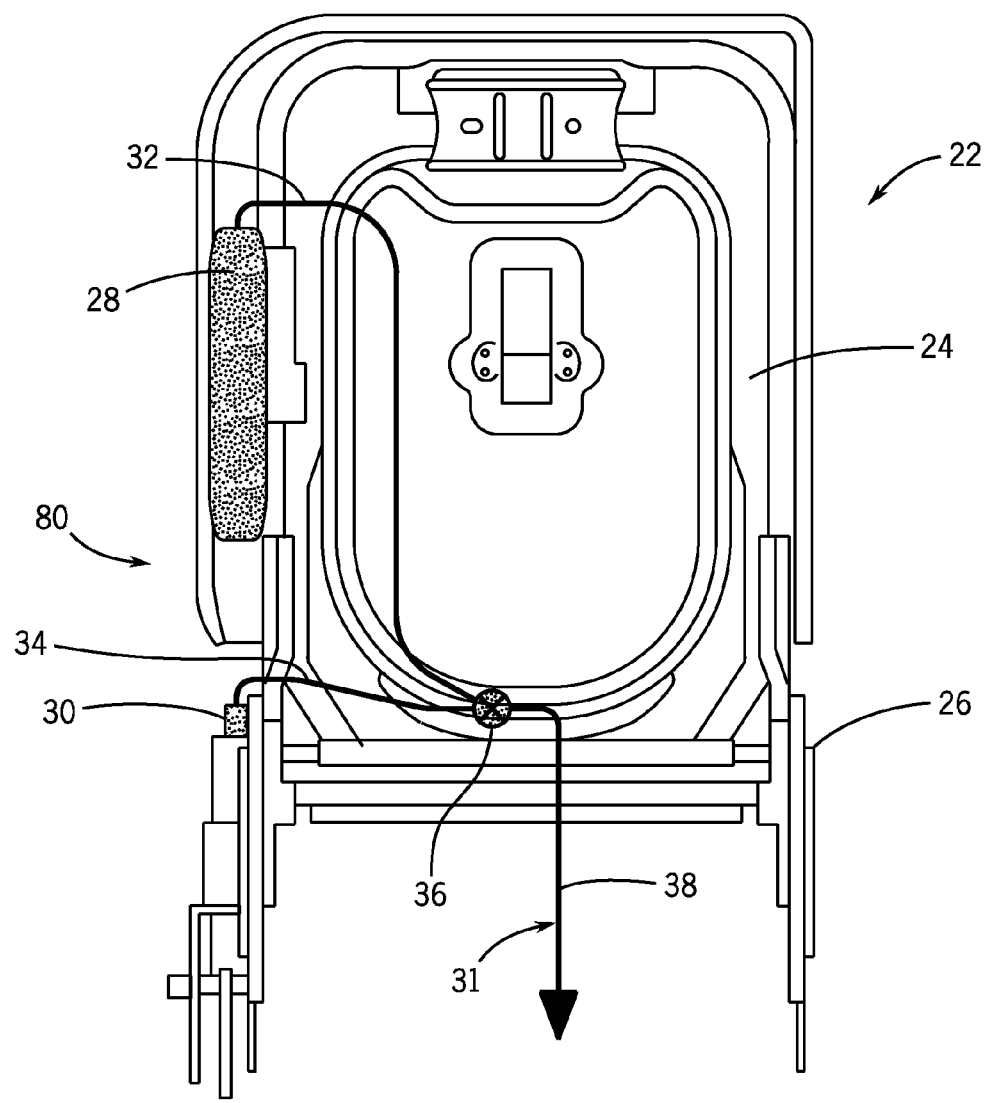
FIG. 8 is a front view of an embodiment of a seat frame of a vehicle seat that can be disposed in the vehicle of FIG. 1.
Figure 9:
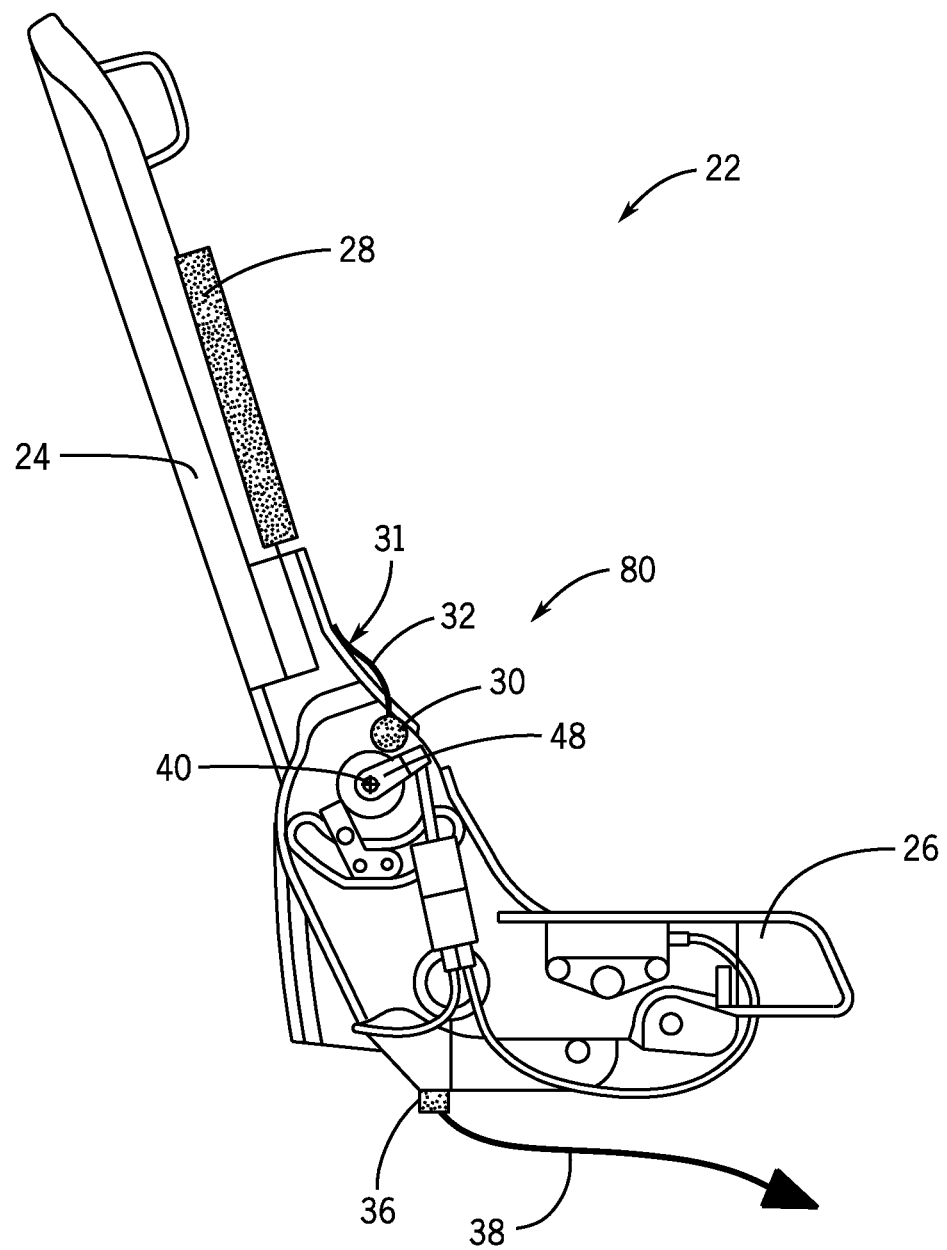
FIG. 9 is a side view of an embodiment of a seat frame of a vehicle seat that can be disposed in the vehicle of FIG. 1.

The airbag mechanism 30 may be located or installed in a variety of locations within the vehicle 20 or the vehicle seat 22. For example, as shown in FIGS. 4A, 8, and 9, the airbag mechanism 30 may be located on or within the vehicle seat 22. As shown in FIGS. 6 and 7A-7F, the airbag mechanism 30 may be located in a fixed bolster region 56 and 66. The airbag mechanism 30 may be located with particular components, such as the latch, recliner mechanism, folding mechanism, seat back pivot point 40, lock assembly 48, or seat track 14. Alternatively, the airbag mechanism 30 may be located within the floor, door, or body of the vehicle 20. Further, the airbag mechanism 30 may be located anywhere along the electrical wiring 31 to the airbag 28, such as within the connection or junction between the airbag electrical wiring 32 and either the seat electrical wiring 34 or the vehicle electrical wiring 38.

Figure 7A:
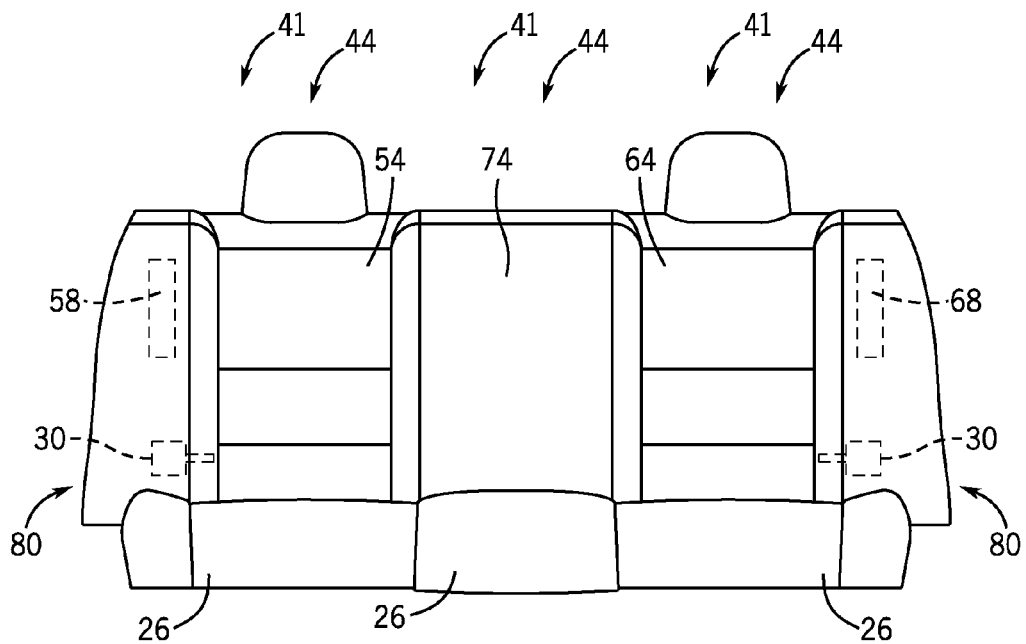
FIGS. 7A-7G are front views of the row of vehicle seats of FIG. 6 in multiple positions.

FIGS. 4B, 5B, and 7H depict logic tables regarding whether or not the airbag 28, 58, or 68 is enabled or disabled depending on the position of the seat back 24, 54, and 64 and whether or not the seat back 24, 54, and 64 is locked in FIGS. 4A, 5A, and 7A-7E, respectively. For example, as shown in FIG. 4B, when the seat back 24 is positioned between the upright position 44 and the reclined position 42, the vehicle seat 22 is in a usable seating position and the seat back 24 is locked. Therefore, the airbag 28 is enabled by the airbag mechanism 30.

Figure 7B:
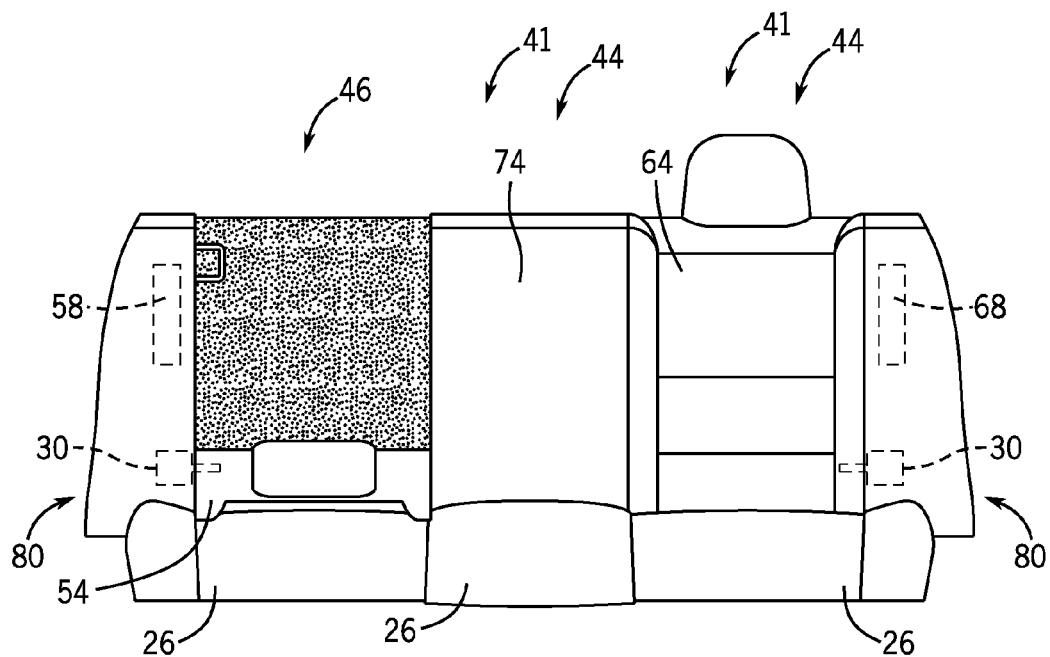
Figure 7C:
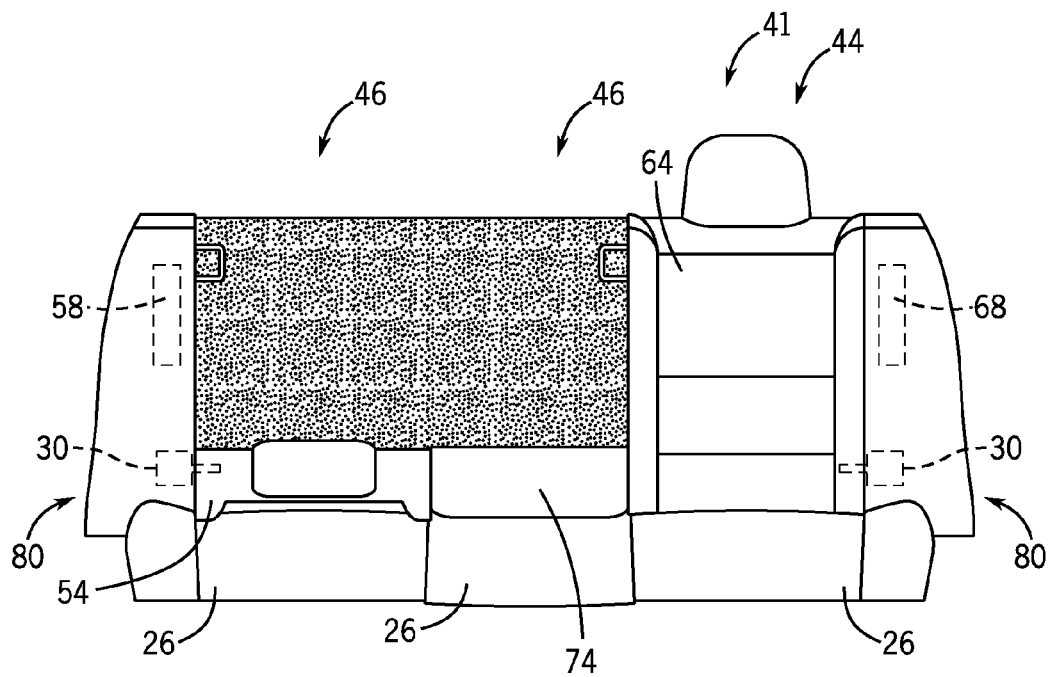
Figure 7D:
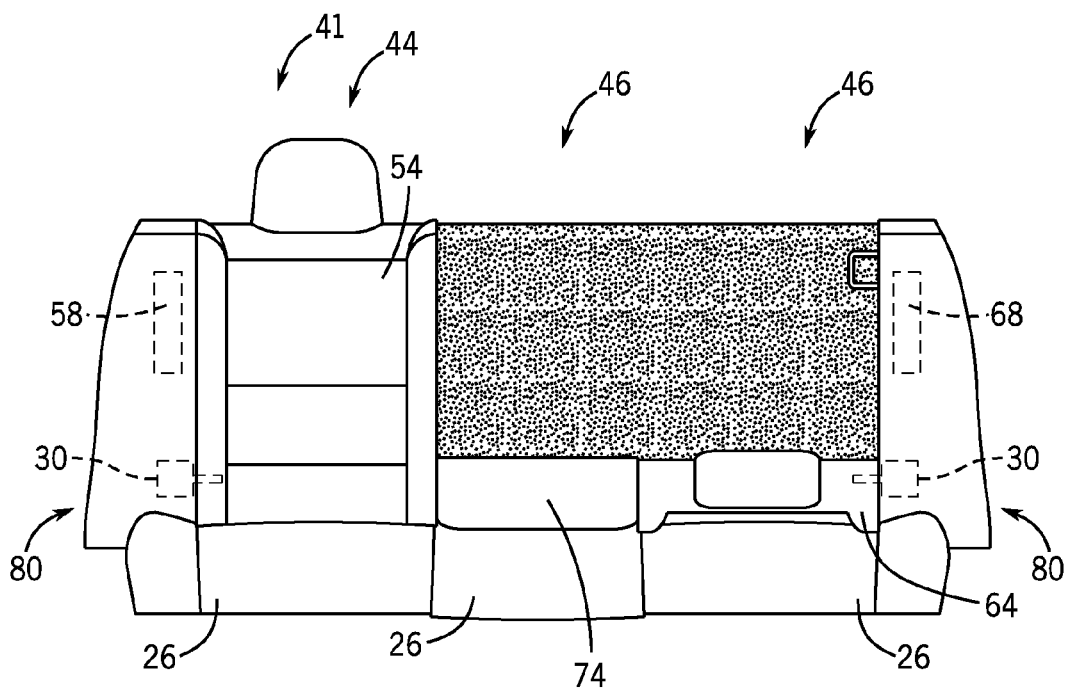
Figure 7E:
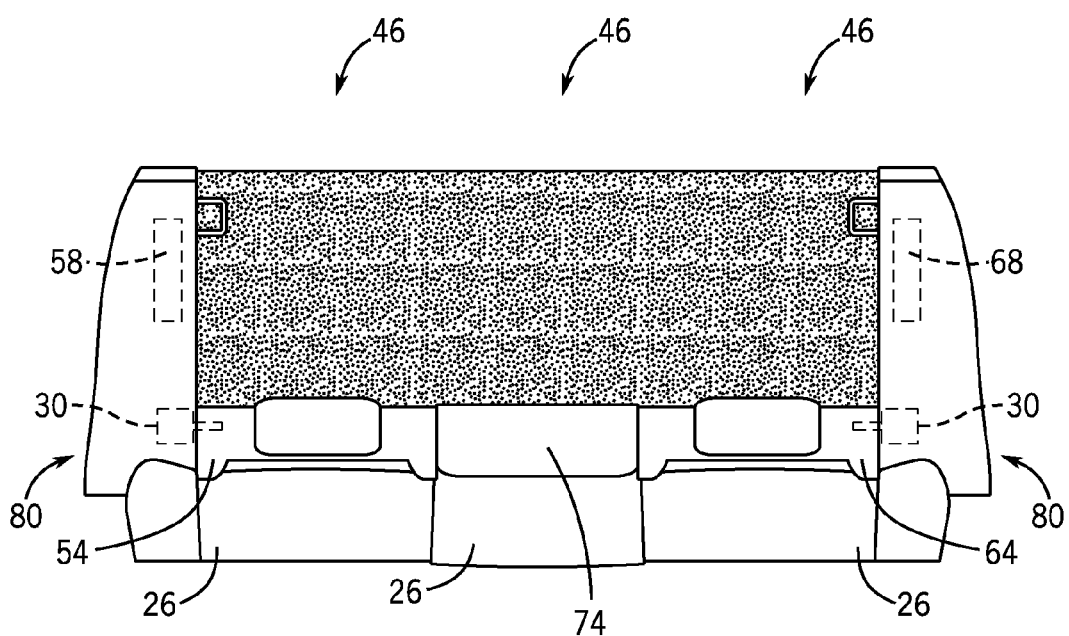
Figure 7F:
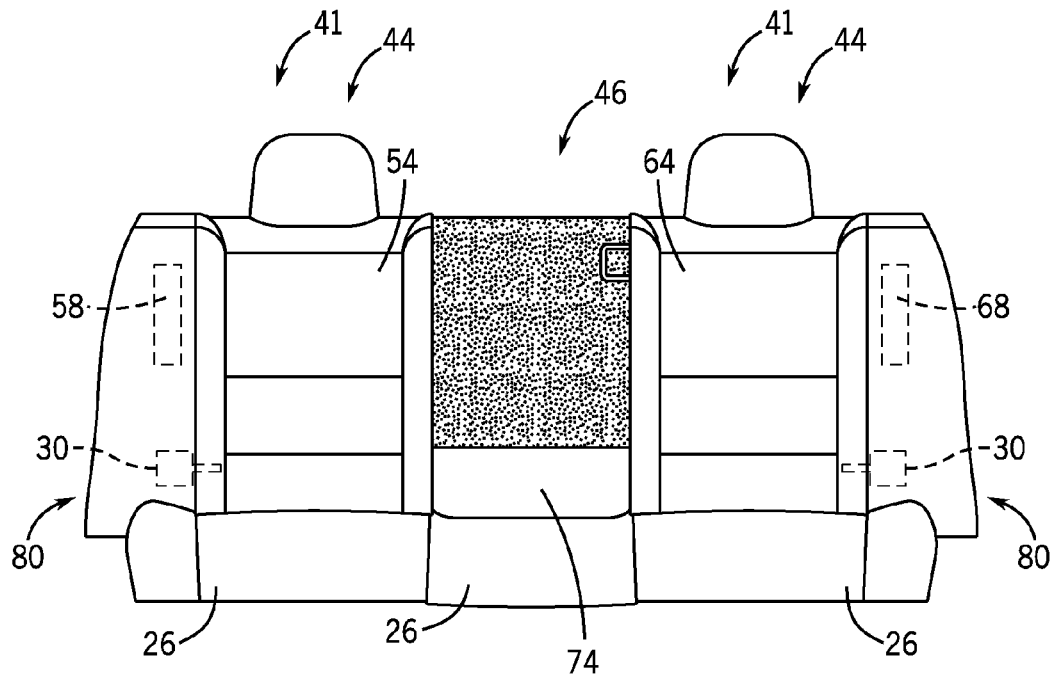
Figure 7G:
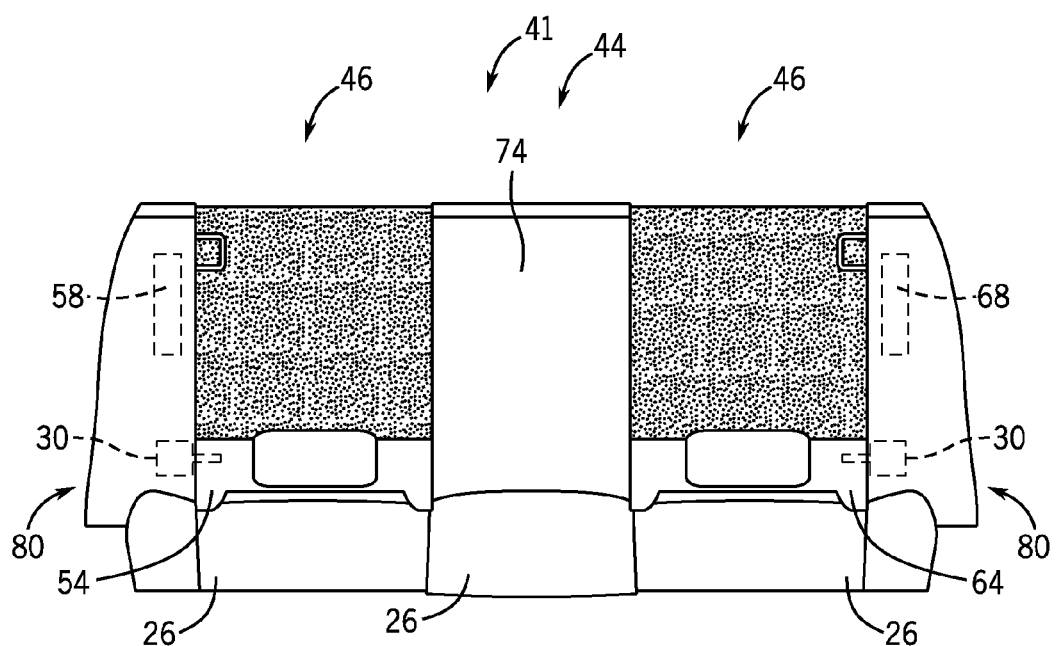

FIG. 6 depicts vehicle seats 22 within a row 50 in a vehicle 20. The row 50 may be, for example, a first, second, or third row 50 within a vehicle 20. Each of the vehicle seats 22 on either side of the row 50 has a corresponding airbag 28. For example, a right-hand airbag 58 may correspond with a right-hand seat back 54 and a left-hand airbag 68 corresponds with a left-hand seat back 64. The airbags 58, 68 may be located within right-hand and left-hand fixed bolster regions 56, 66, respectively. The fixed bolster regions 56 and 66 may not fold with the seat backs 54, 64, as shown in FIGS. 7B-7E and 7G. Whether or not the airbag 58, 68 is enabled or disabled by the airbag mechanism 30 depends on the current position of the corresponding seat back 54, 64, regardless of the position of the other side seat back or a center pass-through or seat back 74 of a center seat 72. For example, as shown in FIG. 7B and the logic table in FIG. 7H, the right-hand seat back 54 is folded down into an unusable position 46 while the center seat back 74 and the left-hand seat back 64 remain in upright positions 44. Therefore, the right-hand airbag 58 is disabled while the left-hand airbag remains enabled.

The various aspects and embodiments of the right-hand seat back 54, the left-hand seat back 64, and the seat back 24 may be comparable and/or transferable. The various aspects and embodiments of the right-hand airbag 58, the left-hand airbag 68, and the airbag 28 may also be comparable and/or transferable.

It is anticipated that the airbag mechanism 30 may be dependent on the vehicle seat 22 position and/or whether or not vehicle seat 22 is locked into position within, for example, the lock assembly 48. Whether or not the vehicle seat 22 is in a usable or unusable position may not necessarily correlate with whether or not the vehicle seat 22 is locked or latched into position.

For example, if the seat back 54, 64 is in a seating position and the seat back 54, 64 latch is locked, the seat 22 may be considered to be in usable position 41. Therefore, in such a scenario, the airbag 58, 68 may be enabled. If the seat back 54, 64 is in a seating position, but the seat back 54, 64 latch is unlocked, the seat 22 may be considered to be in an unusable position 46. Therefore, in such a scenario, the airbag 58, 68 may be disabled. However, if the seat back 54, 64 is in a folded position, regardless as to whether the seat back 54, 64 latch is locked or unlocked, the seat 22 may be considered to be in an unusable position 46. Therefore, in such a scenario, the airbag 58, 68 may also be disabled. Therefore, the seat 22 may be locked and in a seating position to be in the usable position 41 and the seat 22 may be unlocked or in a folded position to be in the unusable position 46.

FIGS. 8 and 9 depict the airbag 28 attached to a frame of the vehicle seat 22. The various electronic components, such as the airbag electrical wiring 32, the seat electrical wiring 34, the electrical connectors 36, and the vehicle electrical wiring 38 may run through or near the vehicle seat 22 structure. Additional electronic components, such as pigtails, may be used within the vehicle seat 22. These electronic components may be arranged and order into various configurations according to the desired configuration.

Figure 10:
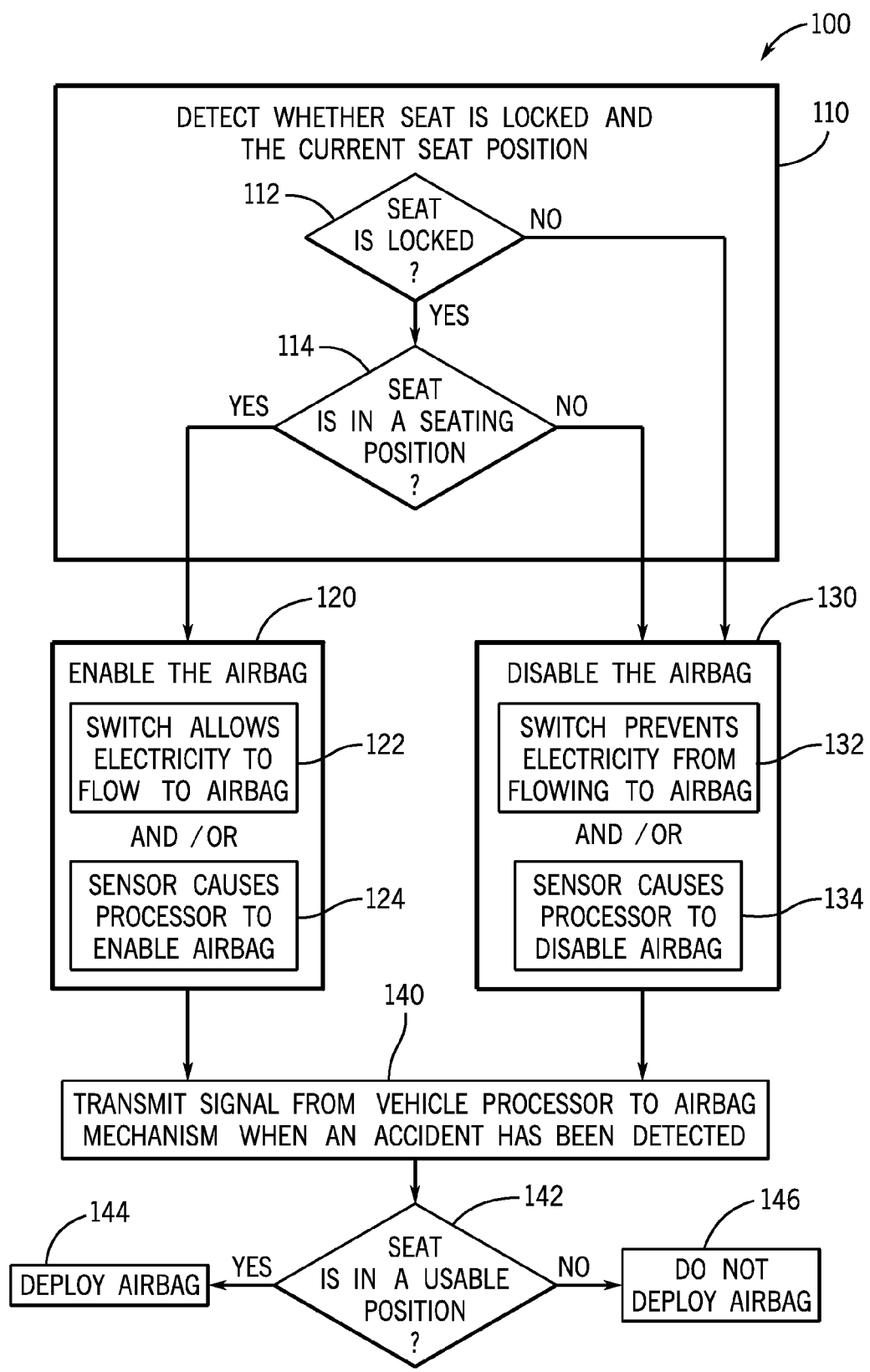
FIG. 10 is a schematic representation of a method of controlling an airbag according to one embodiment.

FIG. 10 depicts a method 100 of controlling an airbag 28 for a vehicle seat 22 in a vehicle 20. The method 100 may include detecting whether the seat 22 is locked and the current seat position (step 110). If the seat 22 is locked (step 112) and the seat 22 is in the seating position (step 114), the seat 22 is in a usable position 41 and the airbag 28 will be enabled (step 120). If the seat 22 is not locked (step 112) and/or the seat is not in a seating position (step 114), the seat is in an unusable position 46 and the airbag 28 will be disabled (step 130).

Enabling and disabling the airbag 28 may include providing a switch 82 that allows electricity to flow from the vehicle 20 to the airbag 28 when the seat 22 is in the usable position 41 (step 122) and that prevents electricity from flowing to the airbag 28 when the seat 22 is in the unusable position 46 (step 132). Alternatively or additionally, enabling and disabling the airbag 28 may include providing a position sensor 84 that causes an airbag processor 86 to enable the airbag 28 (step 124) or to disable the airbag 28 (step 134).

The method 100 may further include transmitting a signal from a vehicle processor 96 to an airbag mechanism when a vehicle accident has been detected (step 140). If the seat 22 is in a usable position (step 142), the airbag 28 will deploy (step 144). If the seat 22 is not in a usable position (step 142), the airbag 28 will not deploy (step 146).

Figure 13:
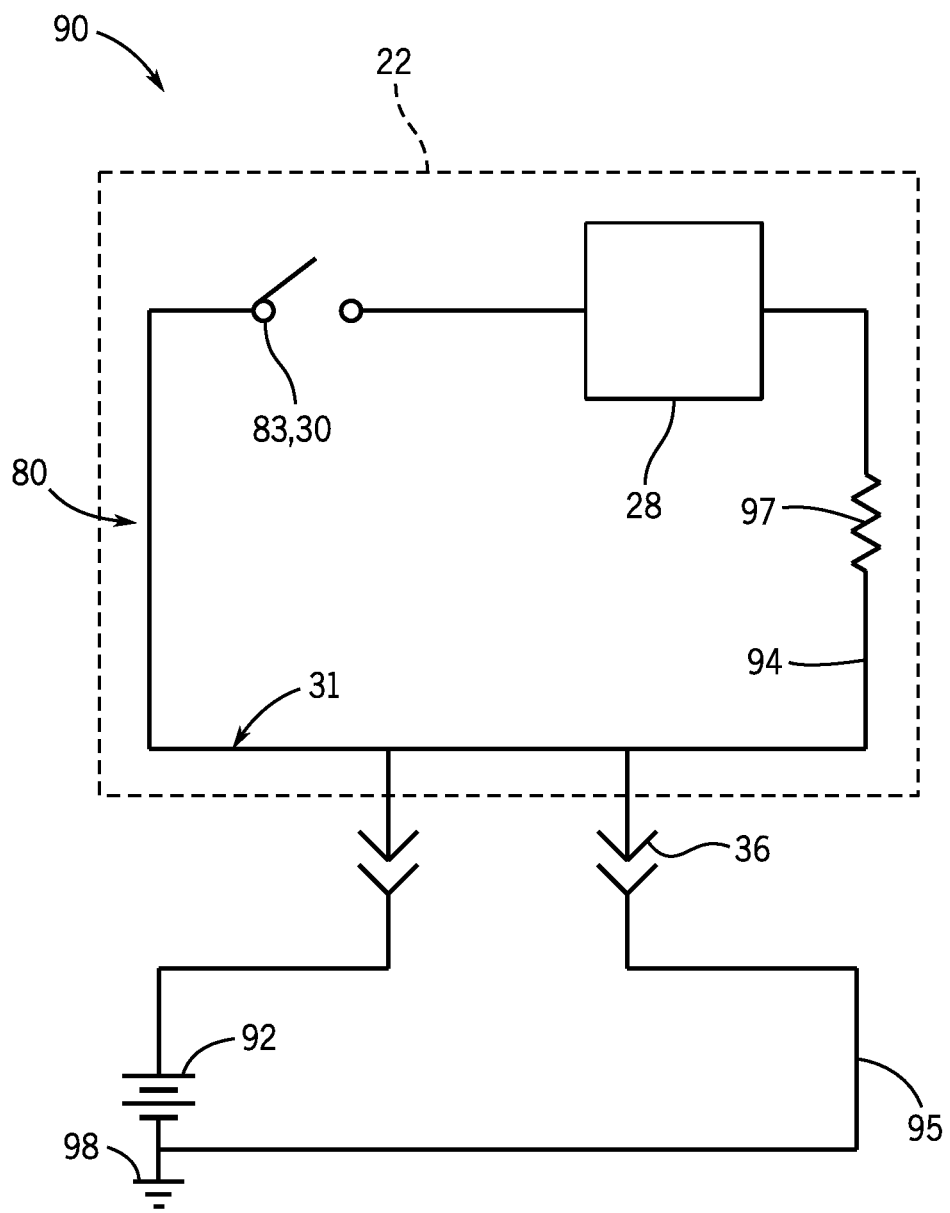
FIG. 13 is a circuit diagram of the vehicle seat of FIG. 2 with one embodiment of the airbag control assembly.

One embodiment of the airbag control assembly 80 may be shown in a circuit diagram, as shown in FIG. 13. The circuit 90 may include a vehicle portion 95 and a vehicle seat portion 94. The vehicle portion 95 may be within various areas of the vehicle 20, while the vehicle seat portion 94 may be within the vehicle seat 22. The vehicle portion 95 and the vehicle seat portion 94 may be electrically connected through at least one electrical connection (e.g., through the electrical connector 36). Various types of electrical connections may be used, such as a plug and jack or socket, as shown in FIG. 13. The circuit 90 may also include various other electrical components, such as at least one resistor 97 or capacitor.

The vehicle portion 95 may include the vehicle power supply 92 (which may be connected to ground 98), which may transmit power through electrical wiring 31 to the vehicle seat portion 94 to deploy the airbag 28. The vehicle power supply 92 may supply DC power, according to one embodiment.

The vehicle seat portion 94 may include at least a portion of the airbag control assembly 80. For example, the vehicle seat portion 94 may include the airbag mechanism 30 to control whether or not the circuit 90 is completed to enable or disable the airbag 28. For example, the airbag mechanism 30 may include an electrical switch 83 to open or close the circuit 90. The airbag mechanism 30 may further include a position sensor 84 to sense the current position of the vehicle seat 22 in order to determine whether or not to open or close the circuit 90 with the switch 83.

By preventing the airbag 28 from deploying (or deactivating the airbag 28) while the vehicle seat 22 is in an unusable position 46, the airbag control assembly 80 may protect the surrounding occupants in the vehicle 20. Disabling the airbag 28 may prevent the seat back 24 from flipping up (and potentially injuring nearby occupants) if the airbag 28 within the vehicle seat 22 deploys while the vehicle seat 22 is unlocked. By preventing deployment, the airbag control assembly 80 may also prevent any object resting on the folded seat back 24 from being launched as a projectile if the seat back 24 had been flipped up due to the deployment of the airbag 28.

Additionally, the airbag control assembly 80 may prevent unnecessary and expensive airbag deployment. If the vehicle seat 22 is in an unusable position 46, there is no need to deploy the airbag 28. Thus, the airbag control assembly 80 may additionally be used to reduce the costs of the vehicle 20 by preventing unnecessary deployment.

It is anticipated that the various components, configurations, systems, methods, and features of the different embodiments of the airbag control assembly 80 may be combined or used alone according to the desired use and configuration.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

The embodiments disclosed herein provide an airbag control assembly to correlate the position of a vehicle seat to whether or not an airbag is enabled or disabled. Besides those embodiments depicted in the figures and described in the above description, other embodiments of the present invention are also contemplated. For example, any single feature of one embodiment of the present invention may be used in any other embodiment of the present invention.

Given the disclosure of the present invention, one versed in the art would appreciate that there may be other embodiments and modifications within the scope and spirit of the invention. Accordingly, all modifications attainable by one versed in the art from the present invention within the scope and spirit of the present invention are to be included as further embodiments of the present invention.

What is claimed is:

1. An airbag control assembly for an adjustable vehicle seat in a vehicle, comprising:
   electrical wiring forming at least a portion of a circuit configured to transmit electricity from a vehicle power supply of the vehicle to an airbag;
   an airbag mechanism configured to cause enabling and disabling of the airbag,
      wherein the airbag mechanism is configured to cause enabling of the airbag if the seat is in a usable position,
      wherein the airbag mechanism is configured to cause disabling of the airbag if the seat is in an unusable position,
   wherein the airbag mechanism includes a switch that controls the flow of electricity to the airbag,
      wherein moving the seat to the usable position moves the switch to close the circuit such that electricity can flow to the airbag,
      wherein moving the seat to the unusable position moves the switch to open the circuit such that electricity cannot flow to the airbag.

2. The airbag control assembly of claim 1, wherein the airbag mechanism includes a position sensor that causes a processor to enable or disable the airbag.

3. The airbag control assembly of claim 2, wherein the position sensor detects a current position of the seat and whether or not the seat is locked.

4. The airbag control assembly of claim 1, wherein the usable position is when a seat back of the seat is at least partially reclined or upright, the seat is locked to a floor of a vehicle, and the seat back and a seat cushion are locked.

5. The airbag control assembly of claim 1, wherein the unusable position is when at least a portion of the seat is at least one of at least partially collapsed, at least partially folded, at least partially stowed, unattached from a floor of the vehicle, or unlocked.

6. The airbag control assembly of claim 1, wherein the electrical wiring includes seat electrical wiring to connect the airbag mechanism to vehicle electrical wiring through an electrical connector.

7. The airbag control assembly of claim 1, wherein the airbag mechanism is located on or within the seat.

8. The airbag control assembly of claim 1, wherein the airbag is located within the seat.

9. The airbag control assembly of claim 1, wherein the airbag is located on a body of the vehicle near the seat such that the airbag is configured to protect an occupant within the seat.

10. A method of controlling an airbag for a vehicle seat in a vehicle comprising:
    providing electrical wiring that forms at least a portion of a circuit and an airbag mechanism configured to cause enabling and disabling of the airbag, wherein the airbag mechanism includes a switch that controls the flow of electricity to the airbag;
    detecting whether the seat is locked and a current position of the seat;
    enabling the airbag if the seat is in a usable position; and
    disabling the airbag if the seat is in an unusable position,
        wherein moving the seat to the usable position moves the switch to close the circuit such that electricity can flow to the airbag,
        wherein moving the seat to the unusable position moves the switch to open the circuit such that electricity cannot flow to the airbag.

11. The method of claim 10, further comprising providing a position sensor in the airbag mechanism that causes a processor to enable or disable the airbag, wherein the position sensor detects a current position of the seat and whether or not the seat is locked.

12. The method of claim 10, further comprising transmitting a signal from a vehicle processor to an airbag mechanism when a vehicle accident has been detected and deploying the airbag if the seat is in the usable position.

* * * * *